No. 747,547. PATENTED DEC. 22, 1903.
L. W. GATES.
TAPPING VALVE.
APPLICATION FILED JULY 25, 1903.
NO MODEL. 2 SHEETS—SHEET 1.

WITNESSES.
H. A. Lamb.
S. W. Atherton

INVENTOR.
Louis W. Gates
By A. M. Wooster
Atty.

No. 747,547. PATENTED DEC. 22, 1903.
L. W. GATES.
TAPPING VALVE.
APPLICATION FILED JULY 25, 1903.
NO MODEL. 2 SHEETS—SHEET 2.
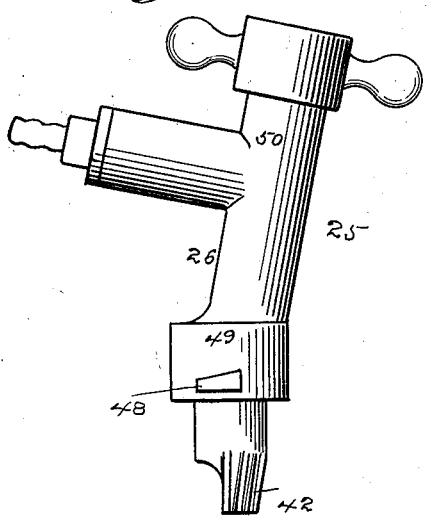
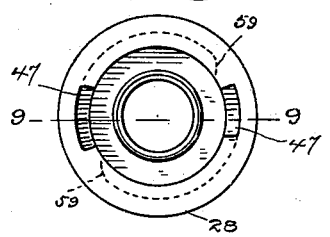
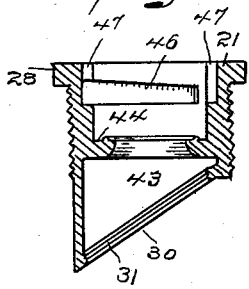
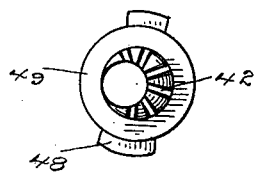
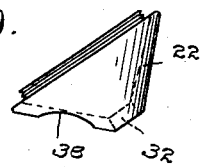
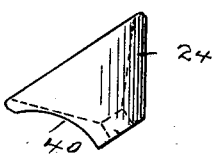
WITNESSES.
H. A. Lamb.
J. W. Atherton.
INVENTOR.
Louie W. Gates
By A. M. Wooster
Atty.

No. 747,547. Patented December 22, 1903.

UNITED STATES PATENT OFFICE.

LOUIS W. GATES, OF WESTHAVEN, CONNECTICUT, ASSIGNOR OF ONE-HALF TO CHARLES SCHOLL, OF NEW HAVEN, CONNECTICUT.

TAPPING-VALVE.

SPECIFICATION forming part of Letters Patent No. 747,547, dated December 22, 1903.

Application filed July 25, 1903. Serial No. 166,976. (No model.)

*To all whom it may concern:*

Be it known that I, LOUIS W. GATES, a citizen of the United States, residing at Westhaven, county of New Haven, State of Connecticut, have invented a new and useful Tapping-Valve, of which the following is a specification.

This invention relates to certain improvements in valves for beverage-containing vessels which will permit the convenient drawing for use of the contained liquid by means of a draft-tube.

With this end in view the invention consists in certain constructions and in certain parts, improvements, and combinations, which will be hereinafter fully described and then specifically pointed out in the claims hereunto appended.

Figure 1:
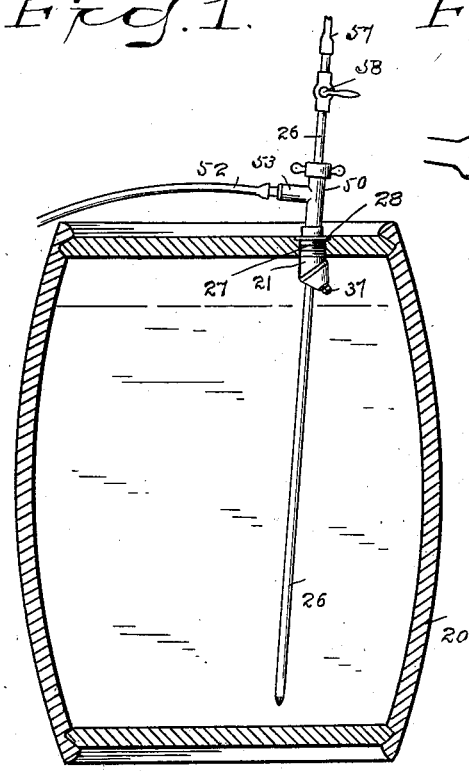
Figure 2:
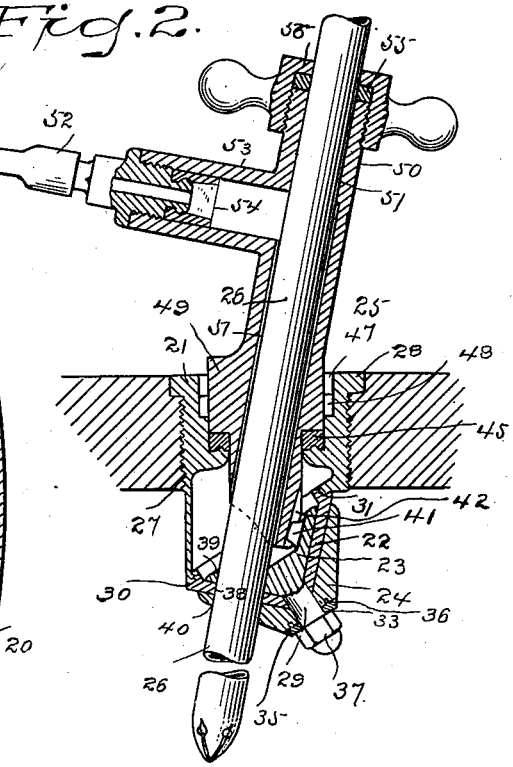
Figure 3:
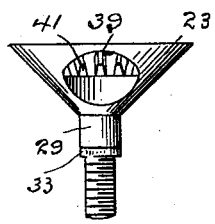
Figure 4:
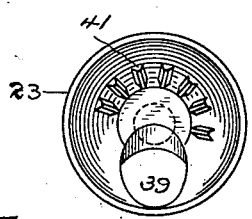
Figure 5:
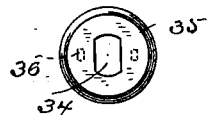

In the accompanying drawings, forming a part of this specification, Figure 1 is a sectional view of a liquid-containing vessel with my novel tapping-valve, the key, and the draft-tube and connections in position as in use; Fig. 2, an enlarged sectional view of the valve and key with the draft-tube in elevation; Fig. 3, an elevation, and Fig. 4 a plan view, of the cone-shaped combined valve-carrier and guard detached; Fig. 5, a plan view of a washer which may or may not be used as a means of attaching the valve to the valve-stem; Fig. 6, an elevation, and Fig. 7 an inverted plan view, of the key detached; Fig. 8, a plan view, and Fig. 9 a section on the line 9 9 in Fig. 8, of the shell detached; Fig. 10, an elevation of the cone-shaped valve-seat detached, and Fig. 11 is an elevation of the cone-shaped valve detached.

20 denotes a liquid-containing vessel, in the present instance a barrel or cask; 21, the shell of my novel valve; 22, the valve-seat; 23, the combined valve-carrier and guard; 24, the valve; 25, the key as a whole, and 26 the draft-tube. The shell is tubular and is shown as inserted into the head of a barrel or cask. I have shown the shell as provided with an external screw-thread 27 to engage the wood of the barrel and at its outer end with a flange 28, which is countersunk into the head of a barrel, the outer end of the shell lying flush with the head. The cone-shaped valve is set at an angle to the axis of the shell and operates by rotation. In order that the shell may be made as small as possible, I provide for the passing of the draft-tube through the shell in a direction oblique to the axial line of the shell and place the valve so as to oscillate on an axial line that if extended would cross the axial line both of the draft-tube and the shell, as clearly shown in Fig. 2. At the lower end of the shell is a circular opening 30, the top of whose surrounding wall lies in a plane oblique to the axis of the shell. The conical valve-seat 22 is secured in this opening obliquely to the axis of the shell. In the present instance the valve-seat is shown as provided with a threaded flange 31, which engages a corresponding thread in opening 30, although the special mode of securing the valve-seat in place is immaterial. It may be riveted, soldered, or otherwise secured to the shell. The valve-seat is a perfect cone, both interiorly and exteriorly, both inner and outer faces being ground, the former to correspond with the combined carrier and guard and the latter with the valve, the corresponding faces of both the combined carrier and guard and the valve being likewise ground. The combined carrier and guard lies within the valve-seat, as clearly shown in Fig. 2, and the stem 29 extends from the apex thereof through a hole 32 in the apex of the valve-seat. The valve 24 is rigidly secured to the valve-stem, so that it will rotate with the combined carrier and guard and the stem. In the present instance I have shown the valve-stem as provided with an angular portion, as at 33, which engages a correspondingly-shaped opening 34 in a washer 35, said washer being provided on its under side with lugs 36, which engage corresponding recesses in the apex of the valve and lock the valve to the stem. The combined carrier and guard and the valve are held in place, so as to oscillate together, with the valve-seat between them, by means of a cap-nut 37, which engages the threaded outer end of the valve-stem. The valve-seat is provided with a hole 38 for the draft-tube to pass through, and the combined carrier and guard is provided with a corresponding hole 39 and the valve with a corresponding hole 40, which when said holes are in alinement, as in Fig. 2, permit the draft-tube to be passed through said three parts. Upon the inner face of the combined carrier and guard opposite to hole 39 I provide a concave rack 41, which is adapted to be engaged by correspondingly-shaped gear-teeth 42 at the lower end of the key. The shell is provided with an opening 43 through it, with an internal seat 44 to receive a packing-washer 45, with internal circumferential cam-grooves 46, and with recesses 47 in the top, which communicate with the central opening and with the cam-grooves and are adapted to receive lugs 48 on opposite sides of the key. It will be noted that one of the lugs and the corresponding recess in the shell is larger than the other lug and recess, so as to render it impossible to insert the key into the shell except when the larger lug registers with the corresponding opening. The key comprises a head 49, upon which the lugs are formed and which is adapted to engage opening 43 in the shell, and a shank 50, which extends upward obliquely from the body, as clearly shown in Figs. 2 and 6.

51 denotes a straight opening extending longitudinally through the stem of the key and obliquely through the body of the key to receive the draft-tube. The lower portion of this opening is of slightly greater diameter than the draft-tube, so as to leave an air-space between the draft-tube and the wall of the opening. This is in order to permit the free passage of air or gas for charging the liquid or for forcing it out through the draft-tube. The air or gas is admitted through a tube 52, connected to a hub 53 upon the shank of the key.

54 denotes the usual valve to prevent back pressure. The upper end of shank 50 is externally screw-threaded and is closed against the escape of liquid, air, or gas by means of a cap 55, internally threaded to engage the thread at the end of the shank and having within it a packing-washer 56, which is compressed tightly about the draft-tube by turning down the cap.

57 denotes the draft-pipe, which is connected to the upper end of the draft-tube, and 58 a shut-off in the draft-tube.

The operation is as follows: When liquid is being drawn from the barrel or other vessel, the gear-teeth upon the key are in engagement with the concave rack upon the combined carrier and guard, the holes in the carrier and guard, valve-seat, and valve are in alinement, and the draft-tube is passed through said holes and down into the barrel, ordinarily approximately down to the bottom thereof. To withdraw the draft-tube and close the barrel, cask, or other vessel, the operator loosens cap 55 in order to relieve the pressure on packing-washer 56, then withdraws the draft-tube past the carrier and guard, then gives the key a partial turn backward to disengage the lugs from the cam-groove, and then withdraws the key and the draft-tube. It should be noted that the key cannot be turned until the draft-tube has been withdrawn past the carrier and guard and that the key cannot be withdrawn until it has been given a partial turn, (approximately a half-turn,) which carries the openings in the valve and the carrier and guard wholly out of alinement with the opening in the valve-seat, and therefore shuts off both the liquid and the air or gas within the vessel that may be used as a pressure medium. As both faces of the valve-seat and the corresponding faces of the valve and the carrier and guard are uniformly ground, the joint is a perfectly tight one, and there can be no escape whatever of either liquid or air or gas. It should be noted, furthermore, that having closed the valve it is impossible to open it without a proper key.

In tapping a barrel or other vessel the operator passes the draft-tube into the key, but not past the carrier and guard, inserts the key into the shell, and gives it a partial turn, which places the openings in the carrier and guard and the valve in alinement with the opening in the valve-seat, then presses the draft-tube as far down into the vessel as desired, and then tightens the cap at the upper end of the key, the operation of tapping a barrel or other vessel or of removing the key therefrom being performed in very much less time than it takes to describe it. As already stated, the lugs upon the key and the corresponding recesses in the shell are so shaped that the key can be passed into the shell in one position only. By inclining the upper walls of the circumferential grooves which receive the lugs—that is, making them cam-grooves—the key is drawn downward slightly as it is rotated, thereby compressing packing-washer 45 upon its seat and making a perfectly thigt joint between the key and the shell. The ends of the circumferential grooves (see 59, indicated by dotted lines in Fig. 8) serve as stops to determine the forward movement of the key at the exact instant that the holes in the valve and the carrier and guard are in alinement with the hole in the valve-seat. There is no uncertainty, therefore, about placing said holes in alinement, so that the draft-tube can be passed through them, and, on the other hand, there is no uncertainty about effectually closing the valve when the draft-tube and key are withdrawn, as the key cannot be withdrawn until the valve is effectually closed.

The oblique setting of the valve not only provides a practical means for enabling it to be conveniently rotated by the key, but it also enables the employment of a straight draft-tube for passing through the opening of the valve without making said valve and the shell or casing thereof of a large size. As hereinbefore stated, the construction as a whole is such that the shell may be made very small.

Having thus described my invention, I claim—

1. A tapping-valve comprising a shell, a conical valve-seat secured thereto, a rotary conical valve lying exterior to the valve-seat, said valve-seat and valve having holes through which a draft-tube may be passed when in alinement and means for rotating the valve, the axis of the valve being oblique to the passage-way formed by said holes.

2. A tapping-valve comprising a shell, a conical valve-seat secured thereto, a rotary conical valve lying exterior to the valve-seat, said valve-seat and valve having holes through which a draft-tube may be passed when in alinement and a key whereby the valve may be rotated and which is provided with a longitudinal opening to receive a draft-tube, the axis of the valve being oblique to the passage-way formed by said holes.

3. A tapping-valve comprising a shell, a conical valve-seat secured thereto obliquely to the axis of the shell, a rotary conical valve lying exterior to the valve-seat, said valve-seat and valve having holes through which a draft-tube may be passed when in alinement and a key whereby the valve may be rotated and which is provided with a longitudinal opening to receive a draft-tube.

4. A tapping-valve comprising a shell, a conical valve-seat secured thereto, a rotary conical valve lying exterior to the valve-seat, a combined carrier and guard lying within the valve-seat and having a stem extending through the apex of the valve-seat to which the valve is secured, said valve-seat, valve and carrier and guard having holes through which a draft-tube may be passed when in alinement, and a key adapted to engage and rotate the carrier and guard and the valve and having a longitudinal opening to receive a draft-tube, the axis of the said valve being oblique to the passage-way through which the draft-tube extends.

5. A tapping-valve comprising a shell, a conical valve-seat secured thereto obliquely to the axis of the shell, a rotary conical valve lying exterior to the valve-seat, a combined carrier and guard lying within the valve-seat and having a stem extending through the apex of the valve-seat to which the valve is secured, said valve-seat, valve and carrier and guard having holes through which a draft-tube may be passed when in alinement and a key adapted to engage and rotate the carrier and guard and the valve and having a longitudinal opening to receive a draft-tube.

6. A tapping-valve comprising a shell, a conical valve-seat ground interiorly and exteriorly and secured to the shell obliquely to the axis of the shell, a carrier and guard having a stem passing through the apex of the valve-seat, a conical valve lying exterior to the valve-seat and secured to the stem, said carrier and guard and valve being ground to correspond with the opposite faces of the valve-seat, and said valve-seat, carrier and guard and valve having holes through which a draft-tube may be passed when in alinement and a key adapted to engage and rotate the carrier and guard and the valve and having a longitudinal opening to receive a draft-tube.

7. In a tapping-valve the combination with a shell and a conical valve-seat secured thereto, of a combined carrier and guard lying within the valve-seat and having on its opposite side a concave rack, said valve-seat and carrier and guard having holes through which a draft-tube may be passed when in alinement, and a key provided at its lower end with gear-teeth adapted to engage the rack, for the purpose set forth, and with a longitudinal opening to receive a draft-tube.

8. In a tapping-valve the combination with a shell, a conical valve-seat secured thereto obliquely to the axis of the shell, a combined carrier and guard lying within the valve-seat and having on its opposite side a concave rack, said valve-seat and carrier and guard having holes through which a draft-tube may be passed when in alinement, and a key having a head adapted to enter the shell and a shank extending obliquely therefrom, said head and shank being provided with an opening to receive a draft-tube and the lower end of the key being provided with gear-teeth to engage the rack.

9. A tapping-valve comprising a shell, a conical valve-seat secured thereto, a combined carrier and guard lying within the valve-seat, a rotatable conical valve lying exterior to the valve-seat, said valve, valve-seat and carrier and guard having holes through which a draft-tube may be passed when in alinement and a key rotatable on an axis independent of the axis of the valve and having a longitudinal opening to receive a draft-tube and adapted to engage both the shell and the carrier and guard whereby the engagement of the key with the shell will open the valve by placing the holes in alinement and the disengagement of the key will close the valve by placing the holes out of alinement.

10. A tapping-valve comprising a shell having an opening extending through it, an internal seat, internal cam-grooves and recesses in the top which communicate with the opening and grooves, a packing-washer engaging the seat, a conical valve-seat secured to said shell, a rotary conical valve lying exterior to the valve-seat, said valve-seat and valve having holes through which a draft-tube may be passed when in alinement and a key rotatable on an axis independent of the axis of the valve and adapted to operate the valve and having an opening to receive a draft-tube and lugs adapted to engage the recesses and cam-grooves, so that engagement of the key with the shell will open the valve and permit a draft-tube to be passed therethrough and will compress the packing-washer and make a tight joint between the key and the shell.

11. A tapping-valve comprising a shell having an opening extending through it, an internal seat, internal cam-grooves which terminate in stops, and recesses in the top of varying size which communicate with the opening and grooves, a packing-washer engaging the seat, a conical valve-seat secured to the shell, a rotary conical valve lying exterior to the valve-seat, said valve-seat and valve having holes through which a draft-tube may be passed when in alinement and a key rotatable on an axis independent of the axis of the valve and adapted to operate the valve and having an opening to receive a draft-tube and lugs of varying size corresponding with the recesses in the shell and adapted to engage the cam-grooves so that the key can only engage the shell in one position, the rotation of the key will be determined by the stops and the valve will be opened and the packing-washer compressed by engagement of the key with the shell and the valve will be closed by disengagement of the key.

12. A tapping-valve comprising a shell, a conical valve-seat secured thereto, a rotary conical valve lying exterior to the valve-seat, said valve-seat and valve having holes through which a draft-tube may be passed when in alinement, and a key rotatable on an axis independent of the axis of the valve and having an opening to receive a draft-tube and adapted to engage the shell and operate the valve, means being provided for making a tight joint between the draft-tube and the key.

13. A tapping-valve comprising a shell, a conical valve-seat secured thereto, a rotary conical valve lying exterior to the valve-seat, said valve-seat and valve having holes through which a draft-tube may be passed when in alinement and a key rotatable on an axis independent of the axis of the valve and having an opening to receive a draft-tube, the lower portion of said opening being of greater diameter than the draft-tube to permit passage of air and an air-tube connected to the key, said key being adapted to engage the shell and to operate the valve, substantially as described and for the purpose specified.

14. A tapping-valve comprising a shell, a conical valve-seat secured thereto, a rotary conical valve lying exterior to the valve-seat, a combined carrier and guard lying on the inner side of the valve-seat and having a stem passing through the valve-seat to which the valve is secured, said valve-seat, valve and carrier and guard having holes through which a draft-tube may be passed when in alinement and a key rotatable on an axis independent of the axis of the valve and having an opening to receive a draft-tube and adapted to engage both the shell and the carrier and guard so that the valve will be opened by engagement of the key with the shell and closed by disengagement of the key.

15. A tapping-valve comprising a shell, a conical valve-seat secured thereto obliquely to the axis of the shell, a rotary conical valve lying exterior to the valve-seat, a combined carrier and guard lying on the inner side of the valve-seat and having a stem passing through the valve-seat to which the valve is secured, the corresponding faces of said valve, valve-seat and carrier and guard being ground and said valve, valve-seat and carrier and guard having holes in one side passing through them obliquely through which a draft-tube may be passed when said holes are in alinement and a key adapted to engage the shell and also the carrier and guard and having an opening extending through it obliquely to receive a draft-tube, substantially as described.

16. A tapping-valve comprising a shell, a key rotatable in the shell and having a straight opening oblique to its axis, and a valve at the inner end of the shell and adapted to be opened by rotation of said key.

17. A tapping-valve comprising a shell, a key rotatable in the shell and having a straight opening oblique to its axis, and a rotatable valve at the inner end of the shell, the axis of said valve being oblique to the axis of the key, means being provided for effecting simultaneous rotation of the key and valve.

18. A tapping-valve comprising a shell, a key rotatable in the shell, and a rotatable valve at the inner end of the shell, the axis of said valve being oblique to the axis of the key, means being provided for effecting simultaneous rotation of the key and valve.

In testimony whereof I affix my signature in presence of two witnesses.

LOUIS W. GATES.

Witnesses:
EDWARD H. BURGESS,
J. A. GILLIE.